Oct. 13, 1970   A. M. KAPRAL   3,533,899

SELF-SEALING ADHESIVE MATERIALS

Filed Oct. 7, 1965

INVENTOR.
ALES M. KAPRAL
BY Mason, Kolehmainen,
Rathburn & Wyss
ATTORNEYS

United States Patent Office 3,533,899
Patented Oct. 13, 1970

3,533,899
SELF-SEALING ADHESIVE MATERIALS
Ales M. Kapral, Chicago, Ill., assignor to Dow Corning Corporation, Midland, Mich., a corporation of Michigan
Continuation-in-part of application Ser. No. 438,323, Mar. 9, 1965. This application Oct. 7, 1965, Ser. No. 497,597
Int. Cl. B32b 3/28
U.S. Cl. 161—128                                  7 Claims

ABSTRACT OF THE DISCLOSURE

A pressure-sensitive adhesive sheet material is disclosed wherein a layer of sheet material (e.g. paper) with a coating of pressure-sensitive adhesive thereon is protected from contact with other materials by a creped backing sheet (e.g. paper) coated with a release material on the side in contact with the adhesive. The release material is a layer of a polyolefin (e.g. polyethylene) or a vinyl resin (e.g. polyvinyl acetate) coated with a film of silicone (e.g. dimethylpolysiloxane). The release material conforms to the surface of the creped backing sheet to provide a creped surface coated with silicone in contact with the pressure-sensitive adhesive. Such adhesive sheet materials provide facile separation of the backing sheet from the adhesive layer by stretching the backing sheet between the fingers to form a tab which is easily grasped to pull off the backing sheet.

---

This application is a continuation-in-part of my copending application Ser. No. 453,293, filed May 5, 1965, now abandoned which is a continuation-in-part of my copending application Ser. No. 438,323, filed Mar. 9, 1965, now abandoned.

This invention relates to self-sealing or pressure-sensitive adhesive materials with releasable backing layers. More particularly, this invention relates to the combination of an organic sheet material coated with an adhesive material with a releasable organic sheet material backing layer coated with a nonadhering (abhesive) material.

Self-sealing or pressure-sensitive adhesive materials such as labels and stickers generally have a coating of pressure-sensitive adhesive on a base material such as paper or cloth. In order to prevent such adhesive materials from sealing or adhering to each other, it is customary to apply a protective backing of paper or cloth to the adhesive layer to prevent its exposure. The backing layer is usually coated with a nonadhering (abhesive) material such as a combination of polyethylene and a silicone to provide a release surface from which the adhesive layer may be readily removed. This release coating facilitates removal of the backing layer prior to application of the adhesive to the appropriate surface.

In the manufacture of pressure-sensitive or self-sealing adhesive materials with backing layers, it is conventional to cut the pressure-sensitive or self-sealing material in such a way that it is somewhat smaller in area than the backing material. This provides exposed areas of the backing or release layer which can be easily grasped by the fingers or by other means for removal of the backing layer from contact with the pressure-sensitive or self-sealing adhesive material. Otherwise, if the adhesive layer and the backing layer are cut in one operation, a sharp edge is produced which is virtually impossible to penetrate for the purpose of separating the backing layer from the layer of adhesive material. As a consequence, it has been conventional to cut a sheet (e.g., paper) coated with pressure-sensitive or self-sealing adhesive to which a backing material coated with a release layer is applied with very sharp dies which cut through only the sheet coated with the pressure-sensitive adhesive, that is the paper or cloth and the adhesive layer thereon, without cutting through the backing material and the layer of release material (e.g., polyolefin-silicone resin) thereon. In addition, the backing material is usually face-cut or split to aid its removal. Not only do these operations require maintenance of extremely sharp dies but careful adjustment thereof so the dies will cut through part of the sheet material without cutting through the remainder of the sheet material. This practice has rendered the production of labels, stickers and other relatively small self-sealing sheet materials inordinately expensive.

It is an object of this invention to provide sheet material coated with self-sealing or pressure-sensitive adhesive material in combination with a backing material which can be cut on conventional equipment to provide labels, stickers and similar items from which the backing can be relatively easily removed.

It is another object to provide sheet material coated with a self-sealing pressure-sensitive adhesive layer and a backing sheet which is easily peeled from the adhesive layer without splitting or face-cutting.

A further object is to provide sheet material coated with a pressure-sensitive adhesive layer and a backing sheet which can be cut and trimmed on conventional cutting equipment.

Another object is to provide sheet material coated with a pressure-sensitive adhesive layer and a backing sheet which can be printed on with ordinary printing equipment.

Still another object is to provide such sheet material with a pressure-sensitive adhesive layer and a backing sheet which has long shelf life and which does not curl or lose adhesiveness on aging.

A further object is to provide methods for producing such materials.

These and other objects are apparent from and are achieved in accordance with the following disclosure.

By the present invention, it has been discovered that sheet materials coated with self-sealing or pressure-sensitive adhesives in combination with backing sheets of creped, crinkled, wrinkled, crimped, rippled, debossed or embossed materials form a combination from which the backing sheet may be readily removed by simply rubbing, bending, stretching or compressing the backing sheet so as to cause it to separate itself from the adhesive layer. One way in which this is readily accomplished is by stretching or extending the backing sheet beyond the self-adhesive member to form a tab or protrusion which can be readily grasped to remove or peel the backing sheet from the self-sealing adhesive layer. In accordance with this invention, it is possible to cut the self-sealing adhesive member and the backing sheet to the same size in one operation and it is not necessary to go through the expensive and complicated cutting practice which has heretofore been employed.

My invention is more fully illustrated from the following description read in connection with the accompanying drawing in which.

Figure 1:
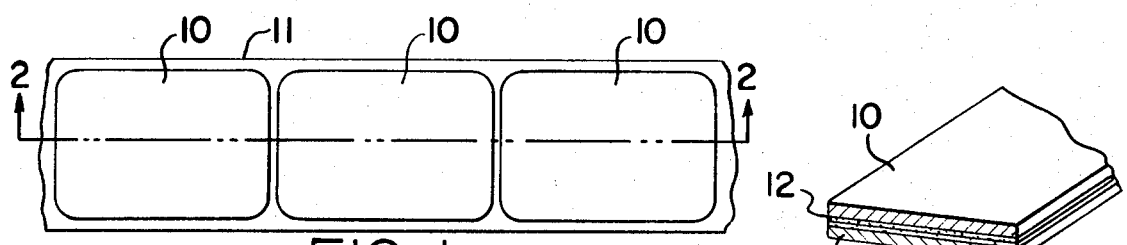
FIG. 1 is a top plan view of a conventional strip of self-sealing labels produced by the prior art procedure.

In considering the deficiencies of prior art self-sealing materials in combination with releasable backing members, reference is made to FIG. 1 which illustrates conventional self-sealing labels 10 on a strip of backing material 11. As shown in FIG. 1, the self-sealing labels are individually cut so that they may be readily removed or peeled from the backing material.

Figures 2, 3:
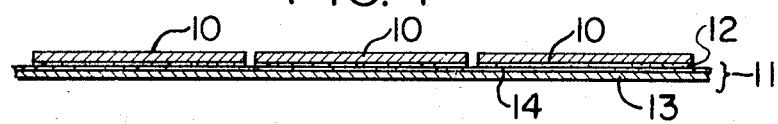
FIG. 2 is a longitudinal cross-sectional view of a conventional strip of self-sealing labels taken along the line 2—2 of FIG. 1.
FIG. 3 is a perspective view of a conventional self-sealing adhesive material with backing sheet wherein the backing sheet is cut to the same size as the self-sealing adhesive material.

In FIG. 2 the paper labels 10 with the layer of self-sealing adhesive 12 is affixed to the backing material 11 which comprises a sheet of paper 13 coated on one side thereof with a thin layer 14 of polyethylene and silicone. The polyethylene-silicone coating 14 forms a release coating to which the self-sealing adhesive 12 adheres only slightly. Consequently, the self-sealing adhesive layer 12 can be readily peeled from the release layer 14 and the adhesive layer is then in condition for adherence to an appropriate object to which the label 10 is to be affixed.

In the production of labels as illustrated in FIGS. 1 and 2, a more or less continuous sheet of backing paper 13 is coated with polyethylene on one side followed by another coating of a silicone to form the release layer 14. Concurrently, a sheet of continuous paper stock is coated with a self-sealing adhesive material 12 and the two continuous sheets are joined together in a conventional manner to form a multi-ply continuous material as shown in FIG. 3 with the self-sealing adhesive layer 12 in contact with the release coating 14. This continuous sheet is then passed through a cutter wherein dies are arranged to cut through the layer of paper 10 and the layer of self-sealing or pressure-sensitive adhesive material 12 without cutting through the plastic release layer 14 or the backing material 13. In this fashion, labels as illustrated in FIG. 1 are produced. It is evident that this procedure is expensive and complicated, particularly with respect to the construction and operation of the cutting machine which cuts the individual labels 10.

Figures 4, 6:
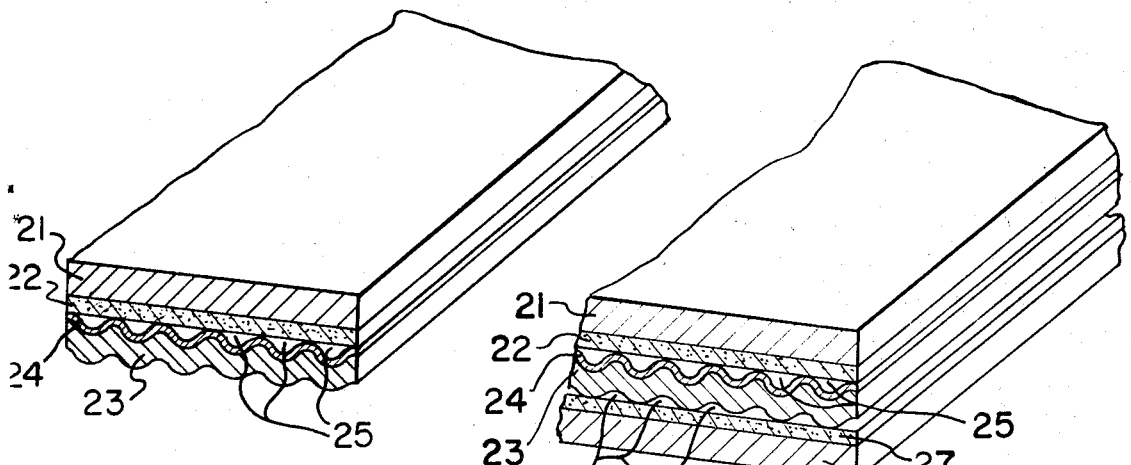
FIG. 4 is a perspective view of a strip of self-sealing adhesive paper with crepe paper backing, illustrating my invention.
FIG. 6 is a perspective view of another embodiment of my invention wherein the crepe paper backing layer has applied thereto a smooth sheet of paper affixed with a coating of glue or other adhesive.

In accordance with the present invention, it is possible to avoid the complicated cutting procedure required to produce the labels of the type illustrated in FIGS. 1 and 2. This desirable end is accomplished as illustrated in FIG. 4 wherein a continuous sheet or strip of paper 21 coated with a self-sealing or pressure-sensitive adhesive layer 22 is joined with a continuous sheet or strip of crepe paper 23 coated on one side with a thin layer of release (abhesive) material 24 (e.g., a polyethylene-silicone resin combination). The coated paper sheet and the coated crepe paper are joined together so that the adhesive 22 is in contact with the release coating 24. As indicated in FIG. 4, there are spaces 25 between the flat adhesive layer 22 and the convoluted release layer 24.

Figure 5:
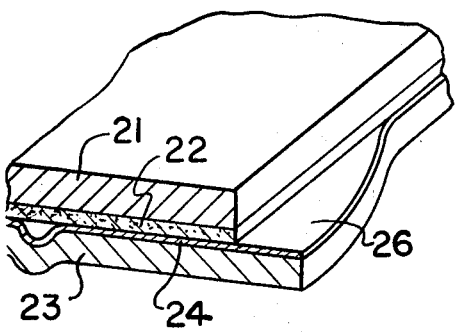
FIG. 5 illustrates the creped backing sheet of FIG. 4 after being stretched to form a tab or protrusion for removal from the self-sealing adhesive material.

As illustrated in FIG. 5, the crepe paper backing material 23 with the release coating 24 thereon can be stretched or extended laterally to form a tab or protrusion 26 which extends beyond the paper 21 and self-sealing adhesive coating 22. This provides a means for grasping the backing material 23 and its coating of release resin 24 so that the backing may be readily removed from contact with the self-sealing adhesive 22.

In the foregoing discussion, the sheet material 21 and the crepe material 23 have been illustrated as paper. These materials can also be made of cloth, non-woven fabric, metal foils, plastic sheeting, wood veneer and the like. In lieu of crepe paper, any crinkled or embossed materials may be used so long as the surface of the release coating 24 in contact with the self-sealing or pressure-sensitive adhesive 22 forms spaces 25 as illustrated in FIG. 4 so that the backing member, that is the combination 23 and 24, can be stretched or otherwise distorted to form a protrusion beyond the layer of adhesive 22.

The self-sealing or pressure-sensitive adhesive coating or layer can be any of the well known materials which have appropriate adhesive properties. For example, they can be rubber-resin adhesives, silicone rubber adhesives (e.g., "Silastic" silicone rubbers of Dow Corning Corporation), chlorinated rubber adhesives, vinyl ether resins, acrylic resin-rubber latex combinations and similar adhesives. These and other suitable pressure-sensitive adhesives are disclosed in Currie et al. 2,814,601, Nov. 26, 1957; Adamik 2,816,348, Dec. 17, 1957; Goodwin 2,857,356, Oct. 21, 1958; Bond et al. 2,882,183, Apr. 14, 1959; Gaynes 3,161,533, Dec. 15, 1964; Hart et al. 3,189,581, June 15, 1965; Gaynes 3,161,533, Dec. 15, 1964; Webber 3,197,326, July 27, 1965; Bartell 3,197,330, July 27, 1965; and Hauser 3,179,552, Apr. 20, 1965; and in patents cited therein.

The backing or release sheet is coated with a thin layer of material which does not adhere to the adhesive layer. This material is called abhesive because its properties are directly opposite to adhesive properties. The preferred abhesive material is polyethylene coated with a silicone, but polyethylene alone and silicone alone are also suitable. Other suitable abhesive materials are polypropylene, polyvinyl alcohol, polyvinyl acetate and similar polyalkenes and vinyl polymers.

The backing sheet is coated with the release layer of abhesive material and then creped, wrinkled, embossed or the like in the dry state. The backing material is preferably creped to 10–15% contraction. However, contraction as high as 50% is suitable.

In a preferred embodiment of my invention, backing paper of basic weight of 10 to 80 lbs. per ream is used, coated on one or both sides with 1 to 10 lbs. polyethylene per side and ream, overcoated with 0.01 to 2 lbs. of cured dimethylpolysiloxane solids per ream and side, then creped or embossed to contract not more than 50% of its original width.

The release layer is usually silicone-coated paper, generally glassine or clay-filled highly calendered kraft paper. The paper may be coated with polyethylene before treated with silicone. A good release paper should have about 50 grams per square inch Keil test release value.

In another embodiment of my invention, as shown in FIG. 6, the creped backing sheet 23 is covered with a sheet of flat-surfaced material (e.g., calendered paper) 28 which is held by means of glue 27 or other suitable adhesive, forming a sandwich with spaces 29 between the sheets. This construction provides two smooth surfaces for printed matter, if desired, and makes for more rigid, less flexible material. This is often desirable for card stock, for example. The creped backing sheet 23 is still readily removable from the layer of self-sealing adhesive 22.

Figure 7:
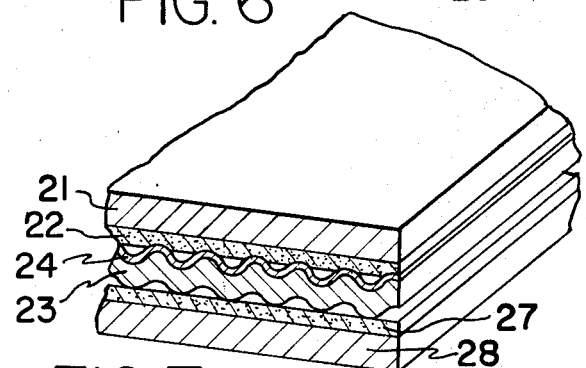
FIG. 7 is another perspective view of the embodiment of FIG. 6.

FIG. 7 illustrates the sandwich construction of FIG. 6 after it has been subjected to compression, as in a calendering machine. The adhesive layer 22 has flowed down around the convolutions in the creped paper 23 coated with a thin polyethylene-silicone layer 24. The creped material is then firmly anchored in the adhesive 22 and resists any lateral movement during printing, trimming or cutting, and general handling. The backing sheet 23 and releasable coating 22 are easily peeled or removed from the self-sealing or pressure-sensitive adhesive layer 22 by slightly bending a corner of the sandwich material (e.g., label) which, by affecting the radius of the coadherent sheet, results in slight overlapping of one layer so that it can be easily grasped for removal.

Referring again to FIG. 7, is it seen that the pressure-sensitive adhesive 22 forms nests or pockets in which parts of the ripples in the creped sheet 23 are embedded. This is a desirable embodiment, particularly if the sheet material is to be printed on without separation of the backing or release sheet 23. It has been found that best results occur when the ripples are embedded about one-quarter to one-half their height into the adhesive layer 22, although if the ripples are embedded from one-tenth to two-thirds of their height the product is satisfactory.

The height of the ripples in the creped or rippled sheet 23 is preferably about 1 millimeter, although the height can vary from one-tenth to three millimeters. Smaller ripples are usually ineffective in preventing lateral movement. Large ripples sometimes complicate printing on the exposed surface of the sheet 21.

The form of the ripples in the sheet 23 is sometimes of importance. In crepe paper these ripples are usually discontinuous so that the channels or valleys between them are not connected. This form is desirable because it prevents air from penetrating into the sheet material and contributing to the aging of the adhesive. It also prevents dust and moisture from entering. It will be understood, however, that uniform ripples (such as in corrugated paper) can be used with continuous valleys between them. While this form allows access of air, moisture and dust to the adhesive layer, this may not be seriously disadvantageous in some applications where the materials are not stored for relatively long periods.

In the form illustrated in FIG. 7 about 15% to 35% of the area of the adhesive layer 22 is in contact with the coated crepe paper (or similar material) 23 and 24. When the release material is dry-creped paper, only about 30% of the area of the pressure-sensitive adhesive is in contact with the coated side of the crepe paper. It is advantageous to keep the area of adhesive in contact with the coated crepe paper to a minimum because the silicone, which is usually a component of the release coating, tends to migrate into the adhesive and reduce the shelf life thereof. In my invention the area of the adhesive in contact with silicone is usually about 70% less than in conventional pressure-sensitive adhesive coated sheets.

When the backing or release sheet is removed from the adhesive layer in the embodiment shown in FIG. 7, this is conveniently done by bending the sheet material in the direction of the backing or release sheet. Because of the significant thickness of the entire sheet, the backing or release sheet 23 has a different radius of curvature from the sheet 21 coated with pressure-sensitive adhesive. The difference in radii of curvature of the two sheets causes the sheets to pull apart during bending.

It has been discovered that paper products made in accordance with this invention are particularly desirable as printing stock for labels, cards, posters and similar items. Even large sheets such as wallpaper can be produced. Printing is especially sharp and clear on such products and the coverage is excellent. The printed material is uniformly darker and denser than on similar paper without the creped or rippled layer. In addition, these paper products are easier to cut and trim than conventional adhesive-coated paper products. Stacks of such paper products can be cut cleanly with guillotine-type cutters, the knives remain clean through repeated cuttings, and the edges of adjacent sheets of paper do not adhere to each other. On the other hand, with conventional pressure-sensitive adhesive paper stocks it is necessary to clean the knives often to remove adhesive therefrom and the edges of adjacent sheets adhere to each other, making separation of sheets a tedious process.

I claim:

1. A pressure-sensitive adhesive material comprising a layer of sheet material, a layer of pressure-sensitive adhesive thereon, and a stretchable creped backing sheet supporting a layer of release material, said release material comprising a layer of resin selected from the group consisting of polyolefin and vinyl resins coated with a film of silicone thereon, both the resin and silicone conforming to the surface of the stretchable creped backing sheet to provide a creped surface of silicone in contact with the pressure-sensitive adhesive wherein about 15% to 35% of the area of the pressure-sensitive adhesive layer is in contact with the layer of release material on the creped backing sheet.

2. A self-sealing adhesive material as defined by claim 1 wherein the layer of sheet material and the backing sheet are paper.

3. A self-sealing adhesive material as defined by claim 2 wherein the layer of release material is polyethylene.

4. A self-sealing adhesive material as defined by claim 1 wherein the layer of sheet material is cloth and the backing sheet is crepe paper.

5. A pressure-sensitive adhesive material comprising a layer of sheet material, a layer of pressure-sensitive adhesive thereon, a stretchable creped backing sheet supporting a layer of release material, said release material comprising a layer of resin selected from the group consisting of polyolefin and vinyl resins coated with a film of silicone thereon, both the resin and silicone conforming to the surface of the stretchable creped backing sheet to provide a creped surface of silicone in contact with the pressure-sensitive adhesive wherein about 15% to 35% of the area of the pressure-sensitive adhesive layer is in contact with the layer of release material on the creped backing sheet, and a second layer of sheet material adhered to the stretchable creped backing sheet on the side opposite to that in contact with the layer of release material.

6. A self-sealing adhesive material as defined by claim 5 wherein the layers of sheet material and the backing sheet are paper.

7. A self-sealing adhesive material as defined by claim 6 wherein the release material is polyethylene.

References Cited

UNITED STATES PATENTS

| | | | |
|---|---|---|---|
| 2,395,668 | 2/1946 | Kellgren et al. | |
| 2,559,098 | 7/1951 | Walz | 161—406 |
| 2,897,109 | 7/1959 | Voigtman | 161—128 |
| 3,028,280 | 4/1962 | Hoffman | 161—128 |
| 3,046,155 | 7/1962 | Reinke. | |
| 3,161,533 | 12/1964 | Gaynes. | |
| 3,403,045 | 9/1968 | Erickson et al. | 161—208 |

MORRIS SUSSMAN, Primary Examiner

U.S. Cl. X.R.

161—146, 406, 208; 117—76, 155